United States Patent [19]

Bluestein et al.

[11] 4,317,899

[45] Mar. 2, 1982

[54] PROCESS FOR PRODUCING FLUOROSILICONE POLYMERS

[75] Inventors: Ben A. Bluestein, Schenectady; E. Robert Evans, Clifton Park, both of N.Y.

[73] Assignee: General Electric Company, Waterford, N.Y.

[21] Appl. No.: 170,272

[22] Filed: Jul. 18, 1980

Related U.S. Application Data

[63] Continuation of Ser. No. 959,544, Nov. 13, 1978, abandoned.

[51] Int. Cl.³ ............................................. C08G 77/06
[52] U.S. Cl. ........................................ 528/14; 528/33; 528/34; 528/36; 528/37; 528/42; 556/467
[58] Field of Search .................... 556/467; 528/14, 34, 528/33, 36, 37, 42

[56] References Cited

U.S. PATENT DOCUMENTS

| 3,002,951 | 10/1961 | Johannson | 528/37 |
| 3,132,167 | 5/1964 | Boot et al. | 260/448.2 |
| 3,477,988 | 11/1969 | Ostrozynski | 528/14 |
| 3,853,932 | 12/1974 | Razzano | 556/459 |
| 3,937,684 | 2/1976 | Razzano | 260/45.75 R |
| 3,974,120 | 8/1976 | Razzano et al. | 260/30.4 SB |
| 3,978,104 | 8/1976 | Razzano | 528/37 |
| 3,997,496 | 12/1976 | Razzano | 528/37 |
| 4,028,338 | 6/1977 | Razzano | 260/825 |
| 4,029,629 | 6/1977 | Jeram | 260/37 SB |
| 4,041,010 | 8/1977 | Jeram | 260/42.26 |
| 4,089,833 | 5/1978 | Simpson | 260/37 SB |
| 4,111,973 | 9/1978 | Bluestein | 260/448.2 E |
| 4,122,247 | 10/1978 | Evans | 528/14 |

Primary Examiner—Melvyn I. Marquis
Attorney, Agent, or Firm—E. Philip Koltos

[57] ABSTRACT

A process for producing a fluorosilicone polymer comprising reacting a fluoro-substituted cyclic polysiloxane with a polymerization catalyst and as the novel ingredient a low molecular weight silanol terminated diorganopolysiloxane polymer and then after the polymer is formed, neutralizing the catalyst. In another embodiment of the present invention, there can be utilized in the polymerization reaction a high molecular weight aliphatic alcohol in place of the low molecular weight silanol terminated diorganopolysiloxane polymer.

8 Claims, No Drawings

PROCESS FOR PRODUCING FLUOROSILICONE POLYMERS

This is a continuation of application Ser. No. 959,544, filed Nov. 13, 1978, and now abandoned.

BACKGROUND OF THE INVENTION

The present invention relates to fluorosilicone compositions and more particularly the present invention relates to the production of fluorosilicone polymers by the polymerization of fluoro-substituted cyclic polysiloxanes in the presence of certain select chain-stoppers.

The processes for producing diorganopolysiloxane polymers and more specifically high molecular weight diorganopolysiloxane polymers are well known. In the case of alkyl and aryl substituted polymers, the process comprises taking the appropriate diorganodichlorosilane and hydrolyzing it. The hydrolyzate that is obtained is then taken and most of the acid and water removed from it. The hydrolyzate is then taken and there is added to it an alkali metal hydroxide. The mixture is then heated at elevated temperatures for sufficient periods of time, so as to preferentially distill the desired cyclic polysiloxanes. Although such a procedure, which is known as a cracking process, produces cyclic polysiloxanes in which the repeating SiO unit varies from 3 to 10 times, most of the cyclic polysiloxanes are cyclotrisiloxane or cyclotetrasiloxane. Further the cracking procedure can be carried out such that the majority of the cyclic polysiloxanes that are formed are either cyclotetrasiloxanes or cyclotrisiloxanes.

When it is desired to produce a diorganopolysiloxane polymer having methyl and phenyl substituents it is desirable to form as much of the cyclo tetrasiloxanes as can be formed. Then the cyclotetrasiloxanes are taken in relatively pure form and there is added to them small amounts of a basic equilibration catalyst and the appropriate amount of chain-stoppers and the mixture of ingredients is heated at elevated temperatures for a period of time so as to produce high molecular weight diorganopolysiloxane polymers, that is polymers having a viscosity of anywhere from 500,000 to 300,000,000 centipoise at 25° C. and more preferably polymers having a viscosity varying from 1,000,000 to 300,000,000 centipoise at 25° C. After the polymerization has reached its highest level the mixture is cooled down, there is added to it a neutralizing ingredient so as to neutralize the basic catalyst and the excess cyclics are removed so as to yield the desired diorganopolysiloxane polymer. It should be noted that such a procedure is traditionally used to make high molecular weight diorganopolysiloxane polymers. However, it can be utilized to produce low molecular weight diorganopolysiloxane polymers such as those having a viscosity of 500,000 to 1,000,000 centipoise at 25° C.

It should be noted that what determines the molecular weight of the final diorganopolysiloxane polymer that is formed during the polymerization reaction is the amount of chain-stopper that is present in the reaction mixture. Such chain-stoppers are usually triorganosiloxy end-stopped diorganopolysiloxane polymers of low molecular weight such as disiloxanes, trisiloxanes and so forth. An example of a suitable chain-stopper for such processes is for instance hexamethyldisiloxane.

The amount of such chain-stoppers in the reaction mixture determines the amount of chain-stoppers available to terminate the polymers that are formed from the cyclo polysiloxane and accordingly, this determines the final molecular weight of the diorganopolysiloxane polymer. As can be appreciated, the smaller the relative amount of the chain-stopper, the higher the molecular weight of the final polymer and the more of the chain-stopper there is present the lower the molecular weight of the final polymer. It should be noted that one procedure for making silanol terminated diorganopolysiloxane polymers in the molecular weight range of 1,000 to 100,000 centipoise viscosity at 25° C. or more, is to take the appropriate low molecular weight silanol material as a chain-stopper and add the desirable amount of such chain-stopper in a mixture of the desired cyclotetrasiloxanes with the appropriate amount of acid or basic equilibration catalyst, and equilibrate the mixture to produce the desired polymer. It is undesirable to have any such low molecular weight silanol terminated diorganopolysiloxane polymer as a chain-stopped for the production of high viscosity diorganopolysiloxane polymers since the presence of silanol groups in such polymers prior to the cure of the composition in the presence of filler results in excessive structuring of the composition such that it can become essentially useless. Accordingly, the presence of silanol groups or moisture is undesirable in the preparation of high viscosity diorganopolysiloxane polymers for the heat vulcanizable silicone rubber compositions, where the organo groups in such diorganopolysiloxane polymers are selected from alkyl groups and aryl groups such as methyl and phenyl.

Accordingly, it was unexpected that silanol groups could be beneficially introduced into a high molecular weight diorganopolysiloxane polymer containing fluorinated substituent groups. However, with respect to the production of fluorinated substituted diorganopolysiloxane polymers it is necessary to discuss the traditional production of such polymers. Triorganosiloxy end-stopped fluorinated substituted high viscosity diorganopolysiloxane polymers are produced by first taking the appropriate fluoro-substituted diorganodichlorosilanes and hydrolyzing them. The hydrolyzate is then taken and its acidity reduced to the appropriate level and the hydrolyzate is separated from excess water. Then there is added to the purified hydrolyzate the appropriate amount of alkali metal hydroxide catalyst and the hydrolyzate is heated at temperatures of about 200° C. or more so as to preferentially distill overhead fluorinated substituted cyclo trisiloxanes. In fluorosilicone chemistry it has been found that cyclo trisiloxanes react more readily in forming polymers than do the corresponding cyclotetrasiloxanes. Accordingly, there is taken the appropriately formed fluorinated substituted cyclo trisiloxanes and there is added to them a basic polymerization catalyst with the appropriate amount of triorganosiloxy end-stopped low molecular weight polymers and the resulting mixture is heated at elevated temperatures so as to form the desired diorganopolysiloxane polymer. However it has been found out that such fluorinated cyclo trisiloxanes polymerize quickly to form the desired high or low molecular weight polymer, so that the traditional low molecular weight triorganosiloxy end-stopped diorganopolysiloxane chain-stoppers whether fluorinated or not do not enter into the cyclo trisiloxane reaction mixture quickly enough. It has been found that such traditional chain-stoppers take from 4 to 6 hours to react appropriately into the cyclo trisiloxane reaction mixture so as to form the desired molecular weight diorganopolysiloxane polymers. Without the slowness of the low molecular weight triorganosiloxy end-stopped chain-stoppers either a low viscosity or a high viscosity fluorinated substituted diorganopolysiloxane polymer could be formed within an hour by the equilibration reaction of the fluorinated substituted cyclo trisiloxane. Thus if the chain-stoppers could react faster into the fluorinated substituted cyclo trisiloxane reaction mixture a high viscosity polymer having a viscosity of 500,000 to 300,000,000 centipoise at 25° C. or preferably having a viscosity of varying from 1,000,000 to 300,000,000 centipoise at 25° C. could be produced as short a time as 1 hour equilibration time. Accordingly, it was highly desirable to find appropriate chain-stoppers for the polymerization of fluorinated substituted cyclo trisiloxanes such that a high viscosity polymer having a viscosity varying from 500,000 to 300,000,000 centipoise at 25° C. could be produced in as short a period of time as 1 hour. This would result in a more efficient and economical process for the production of fluorinated substituted silicone polymers and in turn in the production of fluorinated substituted silicone elastomeric compositions. In this respect it was desirable that any chain-stopper that was selected for such a process produced a polymer that had as good physical properties as the fluorinated substituted polymers produced by the prior art processes.

Accordingly, it is one object of the present invention to provide for a low molecular weight silanol terminated polymer as a chain-stopper for fluorinated substituted cyclo siloxanes so that fluorinated substituted diorganopolysiloxane polymers could be produced more efficiently and more economically.

It is another object of the present invention to provide for a high molecular weight alcohol as a chain-stopper in the equilibration of fluorinated substituted diorganopolysiloxane polymers so as to provide for more efficient and economic process for producing such polymers.

It is an additional object of the present invention to provide for a process for producing high molecular weight fluorinated substituted diorganopolysiloxane polymers in which the process is more efficient and economic than prior art processes and in which the final polymer has properties which are as good as the fluorinated substituted diorganopolysiloxane polymers produced by prior art processes. These and other objects of the present invention are accomplished by means of the disclosures set forth herein below.

SUMMARY OF THE INVENTION

In accordance with the above objects there is provided by the present invention a process for producing fluorosilicone polymers comprising (1) reacting (a) a cyclo polysiloxane of the formula, $$(RR^1SiO)_t \quad (1)$$

where $R^1$ is selected form the class consisting of a monovalent hydrocarbon radical and a fluorinated monovalent hydrocarbon radical, where there is some fluoro-substituent groups in the cyclopolysiloxane mixture, t is 3, (b) a chain-stopper of the formula,

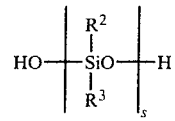

where $R^2$ and $R^3$ are selected from the class consisting of monovalent hydrocarbon radicals and halogenated monovalent hydrocarbon radicals, s is a whole number that varies from 2 to 50 and (c) a basic polymerization catalyst, and (2) neutralizing the basic polymerization catalyst. In the foregoing process it is preferred that the cyclo polysiloxane be a cyclo trisiloxane where R is an alkyl radical and preferably an alkyl radical 1 to 8 carbon atoms or a phenyl radical and $R^1$ is fluoro alkyl radical such as 3,3,3-trifluoropropyl. In another embodiment of the present invention that is provided a process for producing fluorosilicone polymers comprising (1) reacting (a) a cyclo polysiloxane of the formula, $$(R^4R^5SiO)_t \quad (3)$$

where $R^4$, $R^5$ are selected from the class consisting of a monovalent hydrocarbon radical, and a fluorinated monovalent hydrocarbon radical and mixtures thereof, t is 3, (b) a chain-stopper of the formula, $$R^6OH$$

where $R^6$ is an aliphatic monovalent hydrocarbon radical of at least 6 carbon atoms, and (c) a basic polymerization catalyst, and (2) neutralizing the basic polymerization catalyst.

This second embodiment of the present invention can be used to produce polymers other than fluorinated substituted diorganopolysiloxane polymers. However, it is particularly advantageous for the production of fluorinated substituted diorganopolysiloxane polymers. Both processes are preferred for the production of fluorinated substituted high molecular weight diorganopolysiloxane polymers, such as polymers having a viscosity varying from 1,000,000 to 300,000,000 centipoise at 25° C. In both cases it is preferred that the cyclo siloxane be a cyclo trisiloxane because the advantages of utilizing the novel chain-stoppers disclosed above is especially noted in the equilibration reaction of cyclo trisiloxanes and more specifically in polymerization reactions of fluorinated substituted cyclo trisiloxanes.

DESCRIPTION OF THE PREFERRED EMBODIMENT

In the first process for producing diorganopolysiloxane polymers, the process is limited to producing fluorinated substituted diorganopolysiloxane polymers. Accordingly, in Formula 1, R is a monovalent hydrocarbon radical which is preferably selected from alkyl radicals of 1 to 8 carbon atoms such as methyl, ethyl propyl, aryl radicals such as phenyl, methyl-ethyl, and etc. cycloalkyl radicals such as cyclohexyl, cycloheptyl, etc., and alkenyl radicals such as vinyl, etc., but most preferably the R radicals in Formula (1) are preferably selected from alkyl radicals of 1 to 8 carbon atoms such as methyl and phenyl. In that Formula $R^1$ is a fluorinated monovalent hydrocarbon radical and is most preferably a fluoroalkyl radical such as 3,3,3-trifluoropropyl. In the process, most preferably, t is 3, such that the cyclo siloxane is a cyclo trisiloxane.

In the Formula (2) of the chain-stoppers, $R^2$ and $R^3$ are selected from the class consisting of monovalent hydrocarbon radicals and halogenated monovalent hydrocarbon radicals such as alkyl radicals of 1 to 8 carbon radicals, aryl radicals such as phenyl, methyl-phenyl and etc., cycloalkyl radicals, alkenyl radicals such as vinyl, allyl and so forth and fluoroalkyl radicals such as 3,3,3-trifluoropropyl. It is understood that $R^2$ and $R^3$ can both be alkyl radicals or be selected from an alkyl radical and aryl radicals such as methyl and phenyl. However, in the most preferred embodiment of the instant case it is preferred that one of the $R^2$ and $R^3$ radicals be an alkyl radical of 1 to 8 carbon atoms or aryl radical such as methyl or phenyl, and in the other radical be a fluoroalkyl radical such as 3,3,3-trifluoropropyl. In that Formula, s is a whole number that varies from 2 to 50. Usually by one process of producing such low molecular weight silanol terminated diorganopolysiloxane polymers of the Formula (2) as will be explained below there is obtained a polymer blend such that there is about 70% of a polymer with 3 siloxy units and such that the other 30% of the polymer mixture is composed of disiloxy, tetrasiloxy, pentasiloxy, hexasiloxy, heptasiloxy, octasiloxy, etc., silanol terminated diorganopolysiloxy polymers.

Accordingly, it is to be understood that even though a single specie polymer can be utilized in the instant process there also can be utilized in the instant process and is usually utilized in the instant process a mixture of silanol terminated diorganopolysiloxane polymers of the Formula where s has various values. Proceeding now to the process, the initial part of the process which is known in the prior art is to take the appropriate fluorinated substituted diorganodichlorosilanes and hydrolyze them in water. After these diorganodichlorosilanes have been hydrolyzed in water, the excess water and acid are separated from the hydrolyzate. The hydrolyzate may then be washed with water and a mild base such as sodium bicarbonate to neutralize the acid. When the acid of the hydrolyzate is below the required level the hydrolyzate is taken and there is added to it an alkali metal hydroxide such as sodium hydroxide at a concentration of anywhere from 0.1 to 5% by weight and the hydrolyzate mixture is heated at elevated temperatures of above 200° C. at atmospheric pressure or a vacuum so as to preferentially convert and distill overhead from the hydrolyzate a cyclo siloxane. There can be distilled overhead from such a hydrolyzate with such a procedure, cyclo polysiloxanes where the number of SiO groups varies from 3 to 10 with most of the cyclo polysiloxanes being cyclo trisiloxanes and cyclo tetrasiloxanes. Since in the instant fluorinated process it is easier to work with polymerization of cyclo trisiloxanes, this cracking step is carried out so that there is preferentially distilled overhead cyclo trisiloxanes. This is done by keeping the temperature of the cracking vessel at a sufficiently low point so as to boil off the fluorinated substituted cyclo trisiloxanes there are formed while the temperature is not sufficiently high to distill off the cyclo tetrasiloxanes and the higher boiling cyclo siloxanes. Accordingly, utilizing such a procedure, the hydrolyzate can be converted to mostly cyclo trisiloxanes which are distilled off from the hydrolyzate mixture and collected. These cyclo trisiloxanes then form the basic reactant for forming the base fluorinated substituted polymers. It should be noted that the diorganodichlorosilanes and accordingly the cyclo trisiloxanes usually have in them as the basic substituent groups or siloxy groups in such compounds methyl, 3,3,3-trifluoropropyl siloxy groups, since such groups are the most easily obtained fluoro-substituted cyclo trisiloxanes. Now it is necessary to go into the process for forming the chain-stopper of Formula (2). The process for forming such a chain-stopper is adequately setforth in U.S. Pat. No. 3,853,932, J. S. Razzano, which is hereby incorporated into the present case by reference. However, to paraphrase the disclosure of that patent what is done is to take a cyclo trisiloxane which can be a dimethyl or a diphenyl cyclo trisiloxane as disclosed above or preferably can be a methyl 3,3,3-trifluoropropyl cyclo trisiloxane and there is added to it an equal weight of acetone and 19% of the starting amount of cyclo trisiloxane of distilled water and to this mixture there is added from 0.1 to 5% by weight of acid activated clay sold by Filtrol Corporation of Los Angeles, Calif. It should be noted that the acid activated clay acts as a catalyst in the reaction mixture. The resulting mixture is heated to reflux for over 16 hours during which heated process there is added additional amounts of water, the heating temperature being at a range of 50° to 75° C. After a total heating time of anywhere from 16 to 24 hours, there is obtained a mixture of acetone, the foregoing silanol terminated low molecular weight diorganopolysiloxane polymers of Formula (2), water and clay. The resulting mixture is filtered through celite, a diatomaceous earth to take out the clay. The mixture is then heated to strip off the solvent mixture that is the acetone and water. Finally the mixture is heated in the range of 70° to 100° C. under nitrogen sparge so as to remove the residual amounts of acetone and water.

There results in the reaction mixture, the silanol terminated low molecular weight diorganopolysiloxane polymer of Formula (2) in which polymer mixture approximately 70 to 90% of the mixture has three siloxy units and the rest of the polymer mixture is composed of polymers having 2, 4, 5, 6, 7 and a trace amount of a polymer having 8 siloxy units. The polymer usually has a viscosity of in the range 100 to 200 centipoise at 25° C. and a silanol content that varies anywhere from 5 to 7% by weight. It should be noted that the above is not the only process for forming the silanol terminated chain-stoppers of Formula (2), other processes can be utilized. For instance, diorganodichlorosilanes may be hydrolyzed and the purified hydrolyzate be utilized as chain-stopper in the processes of the instant case. There should also be noted that it is not required in the silanol chain-stopper of Formula (2) that there be present fluoroalkyl substituent groups. Accordingly a silanol chain-stopper of Formula (2) having only methyl substituent groups or methyl phenyl or diphenyl or having other substituent groups other than fluoroalkyl substituent groups can be utilized as a chain-stopper in the instant process. Further, a cyclo polysiloxane and preferably a cyclo trisiloxane or cyclo tetrasiloxane will work in the instant process. It is preferred that a cyclo trisiloxane be utilized in the instant process since the fluorinated substituted cyclo trisiloxanes are most preferred in the instant case for producing both low molecular weight and high molecular weight fluorinated substituted diorganopolysiloxane polymers. Accordingly, the desired amount of chain-stopper is mixed with the cyclo polysiloxane of Formula (1) and there is added at least 10 parts per million of a basic polymerization catalyst. Most preferably such basic polymerization catalyst is an alkali metal hydroxide such as potassium hydroxide. For instance, note the disclosure of Johannson U.S. Pat. No.

3,002,951 which is incorporated into the present case by reference. However, other basic catalysts can be utilized in the process such as alkali metal silanolates, also, various complex types of alkali metal salts which can be utilized as polymerization catalysts in the instant process, in accordance with the prior art. The resulting mixture of ingredients is then heated at elevated temperatures and temperatures in the range of 120° to 180° C. and more preferably 140° to 180° C. for a period of time varying from 5 minutes to 4 hours and most preferably varying from 30 minutes to 1 hour to produce a linear fluorinated substituted diorganopolysiloxane polymer, which is silanol end-stopped. The instant process finds utility in producing high viscosity fluorinated substituted linear diorganopolysiloxane polymers. Such polymers have a viscosity of anywhere from 500,000 to 300,000,000 centipoise at 25° C. It should be noted that in the production of such high viscosity fluorinated substituted polymers there is preferably a mixture of at least 400 parts per million of the silanol chain-stopper and at least 10 parts per million of the basic polymerization catalyst. More preferably, there is anywhere from 400 to 2,000 parts per million of the chain-stopper and from 20 to 50 parts per million of the basic polymerization catalyst. It should be also noted that even though the polymerization period can vary anywhere from 5 minutes to 4 hours it generally varies for anywhere from 5 minutes to 2 hours and more preferably 30 minutes to 1 hour. At the end of that period of time there is added a neutralization catalyst, a neutralization agent to the reaction mixture. Such a neutralization agent can be a silyl phosphate as disclosed in the patent application of Razzano et al Ser. No. 854,562 filed on Nov. 25, 1977 now U.S. Pat. No. 4,177,200. Other neutralization agents may be utilized like chlorosilanes, acetic acid and various other mild acids. The advantage of the silyl phosphate is that it is a buffering agent as well as an acetic neutralizing agent such that back-titration is not necessary to reach a substantially neutral level in the polymerization mixture. After the reaction mixture has been neutralized then the mixture is heated at a temperature of at least 150° C. for at least 1 hour to strip off excess cyclics so as to yield the desired polymer. It should be noted that utilizing this procedure there can be obtained the desired polymer with a small amount of volatiles or cyclic polysiloxanes in the equilibration mixture of 5% or less.

It has been found that such silanol terminated fluorinated substituted linear diorganopolysiloxane polymers having a viscosity of anywhere from 500,000 to 300,000,000 centipoise at 25° C. and more preferably having a viscosity varying from 1,000,000 to 300,000,000 centipoise at 25° C. may be taken and there may be compounded into them the various types of fillers and specifically from 5 to 300 parts of filler per 100 parts of the base polymer. The filler is selected from silica fillers and extending fillers. Examples of silica fillers and specifically reinforcing silica fillers are fumed silica and precipitated silica and specifically such silicas which have been treated with cyclo tetrasiloxanes as disclosed in Lucas U.S. Pat. No. 2,938,009 which is hereby incorporated by reference and also such reinforced silica fillers treated with silazanes and diethyl hydroxyl amine. To such mixture of base polymer and filler which are compounded normally in a dough mixer there is added a process aid for instance such as those disclosed in Simpson U.S. Pat. No. 4,089,833 which is hereby incorporated by reference. Such process aids prevent the composition from structuring prior to cure and also from sticking to the compounding mills as disclosed in the foregoing Simpson Patent. To these ingredients there may be added various other additives such as oil resistant additives, flame retardant additives such as carbon black and platinum compression set additives such as rare earth octoate and soforth, to the resulting mixture there may be added the desired level such as from 0.01 to 5% by weight of an organic peroxide catalyst such as dicumyl peroxide, dibenzoyl peroxide and soforth as disclosed in Selin and Berger U.S. Pat. No. 3,773,817 so as to cure the composition to form a fluoro-substituted silicone elastomer. Such fluoro-substituted and specifically what is known as heat vulcanizable fluoro-substituted silicone rubber compositions form silicone elastomers which have good solvent resistance and are especially useful for that reason.

It should be noted that traditional all methyl phenyl base polymers from which heat vulcanizable silicone rubber compositions are formed in which there is incorporated water or in which the base polymer has silanol groups results in the composition crumbling when it is compounded with filler or structuring so it cannot become compounded. It should be also appreciated that such compositions in which there is a peroxide catalyst activated by heating the composition at a temperature above 100° C. so as to activate the peroxide catalyst. The present invention can also be utilized to form base polymers which is useful in fluorinated substituted SiH olefin platinum catalyzed compositions such as those disclosed in Bobear U.S. Pat. No. 4,061,609 which is hereby incorporated by reference. It should be noted that in the foregoing process of the instant case that the cyclic siloxane of Formula (1) need not be a pure material but it may be a mixture of cyclo trisiloxanes with cyclo tetrasiloxanes where the cyclo trisiloxanes are the fluorinated substituted siloxanes and the cyclo tetrasiloxanes have vinyl substitution or methyl vinyl substitution. Such cyclo tetrasiloxanes or methyl vinyl cyclo trisiloxanes are present in the reaction mixture so as to introduce vinyl into the final polymer that is formed such that the composition can cure with a peroxide catalyst to form a heat vulcanizable fluorinated substituted silicone elastomer.

Although the above process can be utilized with advantage there is encompassed by the instant invention a modification of the above disclosure that there may be reacted in to the foregoing cyclo polysiloxanes or more generally even the non-fluorinated cyclo polysiloxanes of Formula (3), a chain-stopper which is a high molecular weight alcohol of the formula $R^6OH$ where $R^6$ is an aliphatic monovalent hydrocarbon radical with at least 6 carbon atoms and more preferably at least 10 carbon atoms such as from 10 to 30 carbon atoms, for instance, octadecanol, hexadecanol, tetradecanol, oleyl and soforth. The high molecular weight alcohols find most advantage in being utilized as chain-stoppers in the process for the formation of high viscosity linear diorganopolysiloxane polymers such as those having a viscosity varying from 500,000 to 300,000,000 centipoise at 25° C. and more preferably having a viscosity varying from 1,000,000 to 300,000,000 centipoise at 25° C. These high molecular weight chain-stoppers will be incorporated into the mixture substantially almost as fast as the silanol chain-stoppers of Formula (2). These alcohol chain-stoppers are cheaper to obtain and do not require specialized processes to produce. Such high alcohol chain-stoppers can be utilized both as chain-stoppers in the equilibration reactions in the production of non-fluorinated substituted polymers as well as in the production of fluorinated substituted polymers.

Accordingly, in Formula (3) $R^4$ and $R^5$ are selected from a class consisting of monovalent hydrocarbon radicals and fluorinated monovalent hydrocarbon radicals and mixtures thereof where t is 3. As noted in the instant process, the $R^4$ and $R^5$ may be selected from alkyl radicals of 1 to 8 carbon atoms such as methyl-ethyl, propyl, alkenyl radicals such as vinyl, allyl and etc., cycloalkyl radicals such as cyclohexyl, cycloheptyl, etc., aryl radicals such as phenyl, methyl-phenyl, ethyl-phenyl and etc., and fluoroalkyl radicals of 3 to 8 carbon atoms such as 3,3,3-trifluoropropyl. In addition in the reaction mixture that is of the cyclo polysiloxanes there can be a cyclo trisiloxane and cyclo tetrasiloxane or higher cyclo siloxane. Most preferably, the cyclo siloxane is either a cyclo trisiloxane or a mixture of cyclo trisiloxanes and cyclo tetrasiloxanes. In the most preferred embodiment of the instant case in the formula of the compound of Formula (3) $R^4$ is an alkyl radical of 1 to 8 carbon atoms such as methyl and $R^5$ is 3,3,3-trifluoropropyl, t is equal to 3. Such a cyclo trisiloxane is mixed with a cyclo tetrasiloxane in which t is equal to 4 and $R^4$ is methyl and $R^5$ is vinyl. These are the type of ingredients that would be necessary to produce a high molecular weight vinyl-containing fluorinated substituted diorganopolysiloxane polymer which would be useful in the preparation of fluoro-substituted heat vulcanizable silicone elastomers.

The process for the production of the fluorinated substituted cyclo trisiloxanes is the same in this embodiment as it was in the last embodiment. The methylvinyl cyclotetrasiloxanes are produced by the same procedure by utilizing the appropriate diorganodichlorosilanes. The only difference being that in the cracking step the reaction mixture is heated at a higher temperature so as to preferentially distill overhead cyclotetrasiloxanes. By using a modified procedure, the cyclotrisiloxanes that are boiled are condensed and returned to the cracking pot for re-reaction so as to obtain a maximum overhead distillation of the cyclo tetrasiloxanes. Accordingly, after the appropriate cyclo siloxanes have been obtained, and mixed together at the appropriate proportions there is added the desired amount of the high alcohol chain-stopper which is readily available in the market place. Then there is added the appropriate amount of the basic polymerization catalyst. With respect to the concentration of the chain-stopper, it may be utilized at anywhere from at least 50 parts per million of the high alcohol chain-stopper to up to 2,000 parts per million and at least 10 parts per million of the basic polymerization catalyst and more preferably from 20 to 50 parts per million of the basic polymerization catalyst. In the production of non-fluorinated polymers there would be utilized solely cyclotetrasiloxanes with a high alcohol chain-stopper and a basic equilibration catalyst such as an alkali metal hydroxide. The resulting mixture is heated at a temperature above 140° C. for anywhere from 2 hours to 24 hours until the maximum amount of the preferred high viscosity polymer is obtained. Then the reaction mixture could be cool, the basic equilibration catalyst would be neutralized with a mild acid such as a silyl phosphate or acetic acid and the unreacted cyclics stripped off to leave behind the desired polymer. In the production of fluorinated substituted polymers a fluorinated cyclo trisiloxane would be polymerized alone or preferably in combination with the vinyl containing substituted cyclo trisiloxane or methyl-vinyl cyclo tetrasiloxane in the presence of the appropriate amount of alcohol chain-stopper and a basic polymerization catalyst such as potassium hydroxide or a potassium silanoate at the concentration shown below and the reaction mixture heated at a temperature range of 120° to 180° C. for a period of time to varying generally from 5 minutes to 4 hours and more preferably varying from 5 minutes to 2 hours and even more preferably varying from 30 minutes to 1 hour. Whereupon after that period of time the basic polymerization catalyst is neutralized with a mild acid such as the preferred silyl phosphate for the resons given in the previous embodiment or with a mild acid such as acetic acid. It should be noted that the same basic polymerization catalysts can be utilized in this embodiment as was utilized in the previous embodiment and as disclosed in the foregoing Johannson patent. Note that any high molecular weight aliphatic alcohol can be utilized in the instant process and preferably a high molecular weight aliphatic alcohol having anywhere from 6 to 30 carbon atoms and more preferably having from 10 to 30 carbon atoms. After polymerization reaction is over the reaction mixture is cooled down, a neutralization agent is added and the reaction is terminated in the preferred period of 30 minutes to 1 hour. The reaction mixture is then cooled down and there is added to it a neutralization ingredient for the basic polymerization catalyst such as a silyl phosphate for the reasons setforth previously. Then the unreacted cyclics are removed to leave behind the desired polymer. The unreacted cyclics are removed by heating the reaction mixture at a temperature of 150° C. for a least 1 hour. It should be noted that while this second embodiment may be utilized to produce a diorganopolysiloxane polymers of various viscosities, it is preferably utilized to produce high viscosity fluorinated substituted linear diorganopolysiloxane polymers. Accordingly, there is obtained a polymer of a formula,

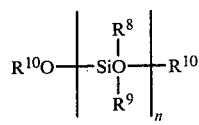

(4)

where $R^8$, $R^9$ are selected from the class consisting of monovalent hydrocarbon radicals and halogenated monovalent hydrocarbon radicals, $R^{10}$ is an aliphatic radical of at least 6 carbon atoms and more preferably at least 10 carbon atoms or generally from 10 to 30 carbon atoms and n varies such that the viscosity of the polymer varies from 500,000 to 300,000,000 centipoise at 25° C. Generally $R^8$ and $R^9$ can be any of the radical or substituent groups given for $R^4$ and $R^5$ in the cyclo trisiloxane of Formula (3) preferably $R^8$ is selected from a mixture of alkyl radicals of 1 to 8 carbon atoms and $R^9$ is 3,3,3-trifluoropropyl and $R^{10}$ is an octadecyl radical.

Such a compound may be taken and preferably one having a viscosity varying from 1,000,000 to 300,000,000 centipoise at 25° C. and there may be added per 100 parts of the base polymer from 5 to 300 parts of a filler and most preferably a reinforcing silica filler selected from fumed silica and precipitated silica which is desirably treated with cyclopolysiloxanes as disclosed in the foregoing Lucas patent or treated with silazanes or diethyl-hydroxyl amine as the case may be. To such a mixture of ingredients which is compounded usually in a dough mixer there may be added various and necessary process aids such as those disclosed in the foregoing Simpson patent and the various other ingredients disclosed above in the first embodiment of this application resulting in a mixture of ingredients that this mixture may then be taken and there may be incorporated into a peroxide catalyst and the resulting mixture is heated at elevated temperatures above 100° C. so as to form a fluorinated substituted silicone elastomer which has the solvent resistant advantages noted previously.

It should be noted that such fluorinated substituted silicone elastomers formed by the above procedure appear to have as good a physical properties as those produced by the prior art methods. It should also be noted that such fluorinated substituted polymers and dimethyl polymers produced by this process may be utilized in SiH olefin platinum catalyzed compositions such as that of the foregoing Bobear patent which is incorporated to the present case by reference.

The Examples below are given for the purpose of illustrating the present invention. They are not given for the purpose of setting bounds or limitations to the definition of the instant invention. All parts are by weight.

EXAMPLE 1

A methylfluoropropyl cyclotrisiloxane and octadecanol as referred to in Table 1 below, were put into a pot and the resulting mixture was heated to 135° C. and purged with nitrogen to remove traces of moisture. Methylvinyl cyclotrisiloxane and sodium hydroxide catalysts were added and the polymerization started. After 38 minutes the reaction was stopped by removing the hot bath and introducing carbon dioxide gas. The polymer was finally neutralized by mixing in the dough mixer with silyl phosphate. The volatiles were determined as disclosed in Table 1 below. The method for determining volatiles is by heating the polymer in a shallow dish at 135° C. and 15 mm. vacuum for 45 minutes and measuring the loss in weight. The Williams Plasticity of the polymers formed prior to the removal of volatiles and after the removals of the volatiles are shown in Table 1 below. The results are setforth and shown in Table 1.

TABLE 1

| Composition | A | B | C | D |
|---|---|---|---|---|
| Methyl fluoropropyl cyclic trimer | 500 parts | 500 parts | 500 parts | 500 parts |
| Octdecanol | 0.4 parts | 0.16 parts | 0.051 parts | 0.052 parts |
| Methyl vinyl cyclic trimer | 1.53 parts | 1.53 parts | 1.53 parts | 1.53 parts |
| NaOH (2% solution) | 0.57 parts | 0.57 parts | 0.57 parts | 0.57 parts |
| Volatiles | 3.6% | 2.3% | 2.2% | 2.0% |
| Williams Plasticity | 137 | 198 | 251 | 247 |
| Williams after removing volatiles | 145 | 208 | 266 | 258 |

Two of the polymers were compounded by mixing 100 parts of the polymer, 3 parts of a dimethyl silanol oil process aid, 4 parts of a high vinyl on chain vinyl gum having 13.5 mole percent vinyl, a process aid, 23 parts of tetramer treated fumed silica filler, and 0.2 parts Red Iron Oxide. The compounded ingredients were press cured with 1.6 parts of a 50% by weight active parts of bis(2,4, dichloro-benzoyl) peroxide. These compositions are referred to as Compositions C and D in Table 2 below. The physical properties of these cured compositions which were cured under the conditions shown in Table 2 are as follows:

TABLE 2

| Composition | Cure | Hardness | Tensile | Elong. | Tear | 347°/22 Comp. Set |
|---|---|---|---|---|---|---|
| C | 400° F./ 4hr. +400° F./70hr. | 46 46 | 1160 1000 | 550% 480% | 92 86 | 36 — |
| D | 400° F./ 4hr. | 46 | 1090 | 560% | 108 | |

EXAMPLE 2

Polymers were prepared by the process of the instant case and process of the prior art wherein the process of the instant case utilizes fluoro-substituted silanol chain-stopper. After the polymers were formed by the prior art process and the instant process, the polymer was heated at 350° for 15 minutes in the presence of wet nitrogen which acted as an hydrolysis agent to increase any tendency of the polymer to degrade. The results are in Table 3 below, which shows the weight loss of the polymer under the above tests.

TABLE 3

| Polymer | Williams Plasticity | End Group | % Wgt. Loss |
|---|---|---|---|
| E | 251 | —Si(CH$_3$)$_2$OH | 11.9% |
| F | 281 | —Si(CH$_3$)(OH)(CH$_2$CH$_2$CF$_3$) | 10.0% |
| G | 332 | —Si(CH$_3$)(OH)(CH$_2$CH$_2$CF$_3$) | 8.7% |
| H | 250 | —Si(CH$_3$)$_3$ | 12.4% |
| I | 267 | —Si(CH$_3$)$_3$ | 7.3% |
| F | 276 | —Si(CH$_3$)$_3$ | 6.5% |

The results in Table 3 indicate that polymers produce utilizing a silanol chain-stopper more specifically a fluorinated substituted silanol chain-stopper are relatively almost as stable as polymers utilizing a trimethylsiloxy chain-stopper.

EXAMPLE 3

A clean dry vessel was charged with 500 parts (1.06 moles) of methyl 3,3,3-trifluoropropyl siloxane cyclic trimer (FS), 1.43 parts (0.001 moles) of 1,3,5,7-tetramethyl-1,3,5,7-tetravinylsiloxane cyclic tetramer (VT), and 0.49 parts (0.001 moles) of 1,3,5-trimethyl-1,3,5 tris (3'3'3'-trifluoropropyl) trisiloxane-1,5-diol. The contents of the vessel are heated to 120°–140° C. and purged with nitrogen until 25 parts of the trimer is removed to lower the moisture content to <10 PPM. The vessel temperature is adjusted to 140° C., when said temperature is achieved, 0.98 parts of sodium fluorosilanolate is added (provides the equivalent of 0.025 g of sodium hydroxide). The polymerization is carried out with agitation for 8–10 minutes then allowed to remain up to 35 minutes before neutralizing the catalyst with silyl phosphate (equivalent to a 13% solution of H$_3$PO$_4$). The polymer is then devolatized at 150°–160° C. to a volatiles level of 0.8±0.5%. A tough gum with a William Plasticity of 255 was obtained. The polymer has a solution viscosity of 2.112 (2% sol in ethyl acetate at 77° F.). The gum when compounded provided good vulcanizate properties.

| Formulation | Parts |
|---|---|
| Polymer Polydimethyl contains 13.5 m % vinyl | 100 |

-continued

| | |
|---|---|
| on chain | 4 |
| HO$-[$Si(Me)$_2-$O$]_{16}$H  | 3 |
| Fumed silica | 23 |
| Rare Earth Octoate | 0.2 |
| TS-50[2] | 1.6 |

[1] Fumed silica treated with 1,3,5,8-octamethylsiloxane cyclic tetramer
[2] Bis(2,4-dichlorobenzoyl) peroxide, 50% active paste;
*Cadox TS-50, Nowry Chemical Corp., Burt, NY
*Luperco CST, Lucidol Div., Pennwalt Corp., Buffalo, NY Press Cure 10 min./287° F. and Post Bake 4 hrs/400° F.

| Property | Silanol Stopped | (CH$_3$)$_3$SiO-Stopped |
|---|---|---|
| Shore A | 41 | 43 |
| Tensile, psi | 1076 | 1145 |
| Elongation, % | 670 | 630 |
| Die C Tear, lbs. | 118 | 102 |
| Comp. Set 22 hrs/300° F. | 25.0% | 25.8% |
| Comp. Set 22 hrs/350° F. | 39.0% | 34.1% |

After Oven Aging 24 hrs/300° F.

| Property | Silanol Stopped | (CH$_3$)$_3$SiO-Stopped |
|---|---|---|
| Shore A | 40 | 44 |
| Tensile, psi | 1140 | 995 |
| Elongation, % | 690 | 590 |
| Die C Tear, lbs | 115 | 105 |
| Comp. Set 22 hrs/300° F. | 19.8% | — |
| Comp. Set 22 hrs/350° F. | 29.0% | — |
| Boyshore | 40 | — |

EXAMPLE 4

A clean dry vessel was charged with 500 parts (1.06 moles) of fluorosilicone trimer, 1.43 parts (0.001 moles) of methylvinyl trimer and 0.61 parts (0.0012 moles) of 1,3,5-trimethyl-1,3,5-tris (3',3',3'-trifluoropropyl) trisiloxane-1,5-diol. The contents of the vessel were heated to 120°–140° C. and as in Example 1, the system was dried and the vessel temperature adjusted to 140° C. The catalyst, sodium fluorosilanolate was added to provide the equivalent of 0.017 parts (0.00042 moles) of sodium hydroxide. The polymerization was terminated after 35 minutes via neutralization with silyl phosphate. The gum was then devoled at 150°–160° C. to a volatiles content of 0.8±0.5%. A gum with a Williams Plasticity of 258 was obtained. The polymer had a solution viscosity of 2.177 (2% ethyl acetate at 77° F.). A Brabender reading of 800 meter grams of torque at a shear rate of 40 RPM at 37° C. The gum when compounded and cured according to the procedure in Example 3 provided the following physical properties:

| Press Cured 10 min/287° F. and Post Bake 4 hours/400° F. | |
|---|---|
| Property | |
| Shore A | 41 |
| Tensile, psi | 1095 |
| Elongation, % | 650 |
| Die C Tear, lbs. | 135 |
| Comp. Set 22 hrs/300° F. | 38% |
| Comp. Set 22 hrs/350° F. | 25% |

EXAMPLE 5

A clean dry vessel was charged with 210 parts (0.45 moles) of fluorosilicone trimer, 0.6 parts (0.007 moles) of methylvinyl trimer and 0.104 parts (0.0002 moles) of 1,3,5-trimethyl-1,3,5 tris (3',3',3'-trifluoropropyl) trisiloxane-1,5-diol. The polymerization mixture was dried according to the procedure described in Examples 3 and 4 except 10 parts of fluorosilicone trimer was removed. The catalyst 0.007 parts (0.00018 moles) of sodium hydroxide colloided (25–30 micron size) in 1,3,5,7-dimethylsiloxane cyclic tetramer was added. The polymerization was carried out for 35 minutes; then the catalyst was neutralized and the gum devolatized according to the aforementioned procedure in Example 1. A devoled gum with a Williams Plasticity of 305 was obtained. The gum had a Brabender reading of 880 meter grams of torque at a shear rate of 40 RPM and at 37° C. The polymer provided a solution viscosity of 2.541 (2% in ethyl acetate at 77° F.).

We claim:

1. A process for producing fluorosilicone polymers of a viscosity varying from 1,000,000 to 300,000,000 centipoise at 25° C. comprising the steps of:
    (1) reacting
        (a) a fluoro-substituted cyclopolysiloxane of the formula:

$(R R^1 SiO)_t$ wherein R is selected from the class consisting of alkyl radicals and phenyl radicals and $R^1$ is a 3,3,3-trifluoropropyl radical, and t is the integer 3; with
        (b) a chainstopper of the formula:

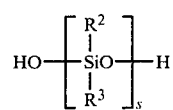

wherein $R^2$ is selected from the class consisting of alkyl and phenyl radicals, $R^3$ is a 3,3,3-trifluoropropyl radical, and s is a whole number which varies from 2 to 50; and
        (c) a basic polymerization catalyst; and
    (2) neutralizing said basic polymerization catalyst.

2. The process of claim 1 wherein said chainstopper is a mixture of polymers selected from those having a value of s varying from 2 through 8, inclusive.

3. The process of claim 1 wherein the basic polymerization catalyst is an alkali metal hydroxide.

4. The process of claim 1 wherein in step (1) there is present at least 400 parts per million of chainstopper (b), and at least 10 parts per million of basic polymerization catalyst.

5. The process of claim 1 wherein step (1) is carried out at a temperature in the range of 120° to 180° C.

6. The process of claim 1 wherein step (1) is carried out for a time period varying from 5 minutes to 4 hours.

7. The process of claim 1 wherein in step (2) the basic polymerization catatlyst is neutralized with a silyl phosphate.

8. The process of claim 1 wherein after step (2) further comprising heating the mixture to at least 150° C. for at least 1 hour to strip off volatiles.

* * * * *